H. C. BULKLEY.
CAR WHEEL.
No. 19,810. Patented Mar. 30, 1858.
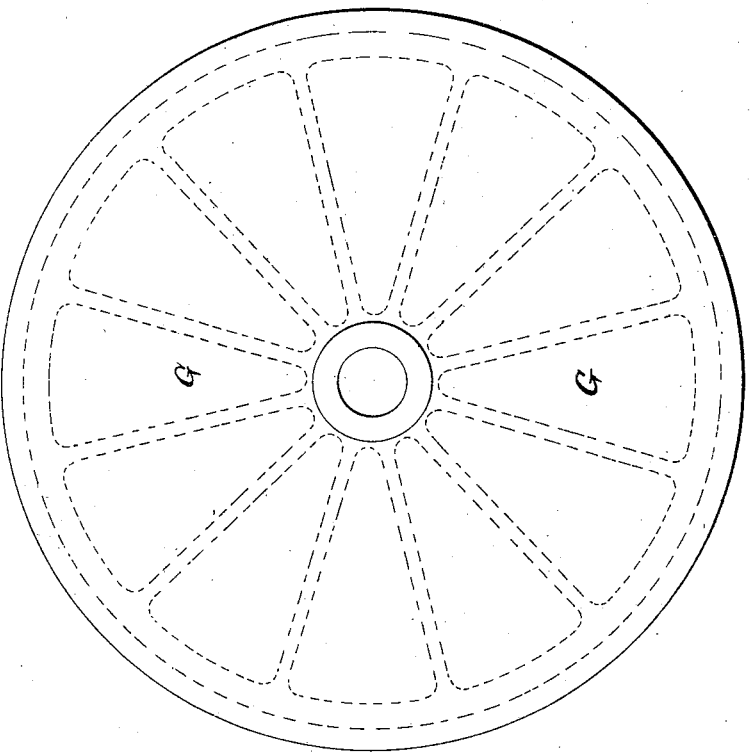
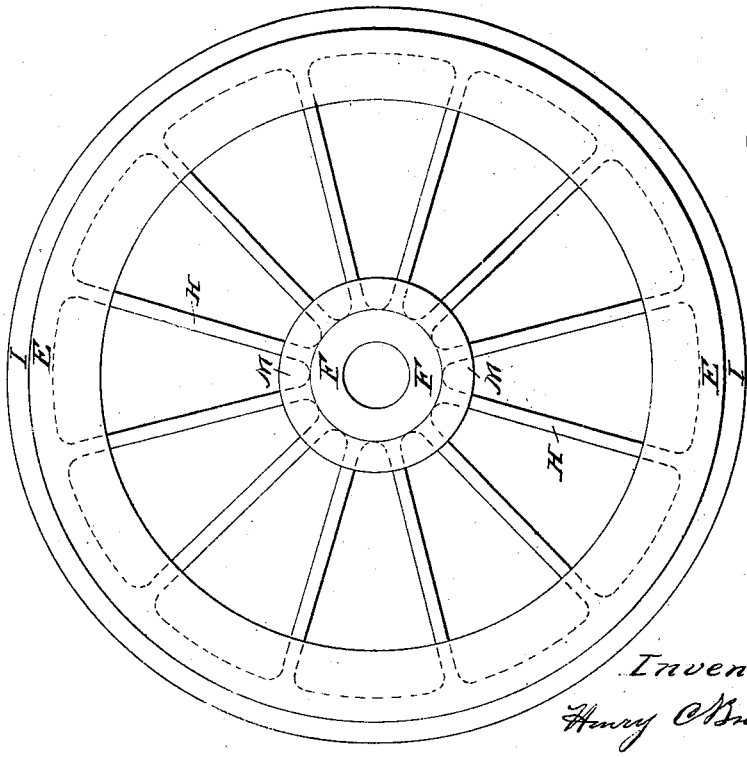
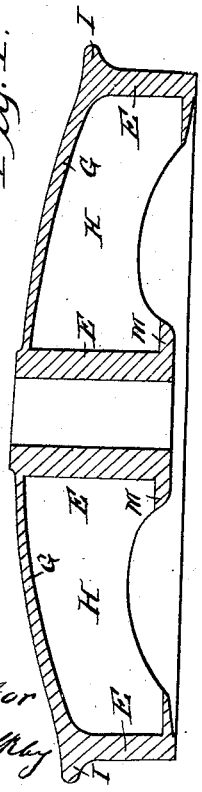

UNITED STATES PATENT OFFICE.

H. C. BULKLEY, OF SPRINGFIELD, MASSACHUSETTS, ASSIGNOR TO JAMES M. ROSS, OF SAME PLACE.

RAILROAD-CAR WHEEL.

Specification of Letters Patent No. 19,810, dated March 30, 1858.

*To all whom it may concern:*

Be it known that I, HENRY C. BULKLEY, of Springfield, in the county of Hampden, in the State of Massachusetts, have invented certain new and useful Improvements in the Mode of Constructing Cast-Iron Railroad-Car Wheels; and I do hereby declare that the following is a full, clear, and exact description thereof, reference being had to the accompanying drawings and to the letters of reference marked thereon.

The nature of my invention consists in constructing the hub and disk of a cast iron car wheel in such a manner as to cast a solid hub and relieve the wheel from the usual strain consequent upon too much iron in the hub and still leave the hub perfectly strong; by reducing the iron around the outer periphery of the hub which relieves the hub of a large amount of heat on cooling after being cast and to retain the requisite strength I substitute a flange on the end of the hub, which leaves the hub stronger than it would be if it was not so reduced; from the fact that a large amount of iron in the center retains the heat long after all of the other parts of the wheel has cooled; and leaves a strain in other parts of the wheel drawing from the center or hub; and to further accomplish the object of releiving the hub of heat, and of counteracting the action of the chill which extracts much of the heat from the rim of the wheel as soon as cast, I gradually increase the thickness of the disk as it recedes from the hub to the tread of the wheel, which causes the heat, iron being one of the greatest conductors of heat, to radiate from the hub into the thinnest part of the disk, thus keeping the heat in the plate or disk uniform, the whole of which has a tendency to make all the parts of the wheel cool evenly and simultaneously, and prevent fractures consequent upon unequal contraction in cooling after casting. By the peculiar construction of my wheel I obviate the necessity and expense of casting the hub in three or more parts and subsequently filling the cavities with suitable metal and banding the hub on both ends with wrought iron before the hub can be turned out to receive the axle; also to make it sufficiently strong—an expense of some three dollars per wheel.

To enable others skilled in the art to make construct and use my invention I will now proceed to describe its construction in detail.

Figure 1 is a transverse section taken centrally through the wheel showing the reduced hub (F), and flange or ring (M), the disk or plate (G) the brackets or spokes (H) and tread (E), and flange (I); the wheel has the ordinary flange and tread. Fig. 2 shows a front elevation of the wheel and Fig. 3 the back side or elevation of the same.

(F, F), the hub; (M, M,) the ring or flange on the end of the hub; (G, G,) the disk or plate of the wheel which I make about three-eights of an inch thicker by gradually increasing its thickness as it recedes from the hub to the tread and flange where it connects, than it is where it connects with the hub for reasons before stated; (H, H,) the brackets or spokes one edge of which is connected to the plate (G) see (Fig. 1.) in the drawings. I may deem it expedient to make the disk thicker and brackets thinner or both thicker as this is a light wheel but still observe the same rule of making the disk $\frac{3}{8}$ of an inch, or about three-eights of an inch thicker where it connects with the tread by gradually increasing its thickness as it recedes from the hub to the tread.

Having thus fully described the nature and construction of my invention; what I claim as new and desire to secure by Letters Patent is—

1. My mode of constructing the hub, viz, by reducing the iron around the outer periphery of the hub and to give the requisite strength I substitute a flange, or ring, on the end, of the hub; when used in combination with a railroad car wheel of one or more plates for the purposes substantially as described.

2. I claim increasing the thickness of the disk as it recedes from the hub to the tread of the wheel in the manner and for the purposes substantially as described.

In testimony whereof I hereunto set my hand this thirtieth day of January A. D. one thousand eight hundred and fifty eight.

HENRY C. BULKLEY.

Witnesses:
N. A. LEONARD,
S. B. WOOLWORTH.